United States Patent
Costa et al.

(10) Patent No.: US 9,336,560 B2
(45) Date of Patent: *May 10, 2016

(54) FACILITATING EFFICIENT SWITCHING BETWEEN GRAPHICS-PROCESSING UNITS

(71) Applicant: Apple Inc., Cupertino, CA (US)

(72) Inventors: Thomas W. Costa, San Francisco, CA (US); Simon M. Douglas, Cupertino, CA (US); David J. Redman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/450,789

(22) Filed: Aug. 4, 2014

(65) Prior Publication Data

US 2014/0340411 A1 Nov. 20, 2014

Related U.S. Application Data

(63) Continuation of application No. 12/683,024, filed on Jan. 6, 2010, now Pat. No. 8,797,334.

(51) Int. Cl.
*G06F 15/80* (2006.01)
*G06T 1/20* (2006.01)
(Continued)

(52) U.S. Cl.
CPC .............. *G06T 1/20* (2013.01); *G06F 1/3203* (2013.01); *G06F 1/3287* (2013.01); *G06F 1/3293* (2013.01); *G06F 9/4411* (2013.01); *G06F 15/76* (2013.01); *Y02B 60/121* (2013.01); *Y02B 60/1282* (2013.01)

(58) Field of Classification Search
CPC .............. G09G 5/363; G09G 2360/06; G09G 2360/08; G06T 15/005; G06F 3/1438
See application file for complete search history.

(56) References Cited

U.S. PATENT DOCUMENTS 4,102,491 A 7/1978 DeVito
4,862,156 A 8/1989 Westberg
(Continued)

FOREIGN PATENT DOCUMENTS

CN 1797345 A 7/2006
CN 1892509 A 1/2007
(Continued)

OTHER PUBLICATIONS

Andrew S. Tanenbaum: "Modern Operating Systems, Second Edition," Feb. 21, 2001, Prentice-Hall, Inc. ISBN: 0-13-092641-8.
(Continued)

*Primary Examiner* — Hau Nguyen
(74) *Attorney, Agent, or Firm* — Blank Rome LLP (57) ABSTRACT

The disclosed embodiments provide a system that facilitates seamlessly switching between graphics-processing units (GPUs) to drive a display. In one embodiment, the system receives a request to switch from using a first GPU to using a second GPU to drive the display. In response to this request, the system uses a kernel thread which operates in the background to configure the second GPU to prepare the second GPU to drive the display. While the kernel thread is configuring the second GPU, the system continues to drive the display with the first GPU and a user thread continues to execute a window manager which performs operations associated with servicing user requests. When configuration of the second GPU is complete, the system switches the signal source for the display from the first GPU to the second GPU.

20 Claims, 7 Drawing Sheets

(51) Int. Cl.
  *G06F 1/32* (2006.01)
  *G06F 9/44* (2006.01)
  *G06F 15/76* (2006.01)

(56) References Cited

U.S. PATENT DOCUMENTS

| | | | |
|---|---|---|---|
| 5,341,470 | A | 8/1994 | Simpson |
| 5,943,064 | A | 8/1999 | Hong |
| 5,963,200 | A | 10/1999 | Deering |
| 5,969,728 | A | 10/1999 | Dye |
| 6,067,613 | A | 5/2000 | Balmer |
| 6,229,573 | B1 | 5/2001 | Sato |
| 6,385,208 | B1 | 5/2002 | Findlater |
| 6,535,208 | B1 | 3/2003 | Saltchev |
| 6,557,065 | B1 | 4/2003 | Peleg |
| 6,624,816 | B1 | 9/2003 | Jones |
| 6,624,817 | B1 | 9/2003 | Langendorf |
| 6,738,068 | B2 | 5/2004 | Cohen |
| 6,738,856 | B1 | 5/2004 | Milley |
| 6,778,187 | B1 | 8/2004 | Yi |
| 6,850,240 | B1 | 2/2005 | Jones |
| 6,943,667 | B1 | 9/2005 | Kammer |
| 6,943,844 | B2 | 9/2005 | Cahill |
| 7,039,734 | B2 | 5/2006 | Sun |
| 7,039,739 | B2 | 5/2006 | Bonola |
| 7,119,808 | B2 | 10/2006 | Gonzalez |
| 7,127,521 | B2 | 10/2006 | Hsu |
| 7,206,004 | B2 | 4/2007 | Toriumi |
| 7,309,287 | B2 | 12/2007 | Miyamoto |
| 7,372,465 | B1 | 5/2008 | Tamasi |
| 7,382,333 | B2 | 6/2008 | Chen |
| 7,477,256 | B1 | 1/2009 | Johnson |
| 7,506,188 | B2 | 3/2009 | Krantz |
| 7,522,167 | B1 | 4/2009 | Diard |
| 7,545,381 | B2 | 6/2009 | Huang |
| 7,576,745 | B1 | 8/2009 | De Waal |
| 7,698,579 | B2 | 4/2010 | Hendry |
| 7,730,336 | B2 | 6/2010 | Marinkovic |
| 7,830,389 | B2 | 11/2010 | Maass |
| 7,839,419 | B2 | 11/2010 | Hanggie |
| 7,849,246 | B2 | 12/2010 | Konishi |
| 7,865,744 | B2 | 1/2011 | Lee |
| 7,882,282 | B2 | 2/2011 | Haban |
| 7,898,994 | B2 | 3/2011 | Zhao |
| 8,199,155 | B2 | 6/2012 | Leroy |
| 8,217,951 | B2 | 7/2012 | Jung |
| 8,233,000 | B1 | 7/2012 | Diard |
| 8,300,056 | B2 | 10/2012 | Nugent |
| 8,368,702 | B2 | 2/2013 | Niederauer |
| 8,508,538 | B2 | 8/2013 | Sakariya |
| 2002/0033812 | A1 | 3/2002 | Van Vugt |
| 2002/0163523 | A1 | 11/2002 | Adachi |
| 2003/0226050 | A1 | 12/2003 | Yik |
| 2004/0075622 | A1 | 4/2004 | Shiuan |
| 2004/0207618 | A1 | 10/2004 | Williams |
| 2005/0012749 | A1 | 1/2005 | Gonzalez |
| 2005/0030306 | A1 | 2/2005 | Lan |
| 2005/0093854 | A1 | 5/2005 | Kennedy |
| 2005/0096854 | A1 | 5/2005 | Larsson |
| 2005/0099431 | A1 | 5/2005 | Herbert |
| 2005/0231498 | A1 | 10/2005 | Abe |
| 2005/0237327 | A1 | 10/2005 | Rubinstein |
| 2005/0244131 | A1 | 11/2005 | Uehara |
| 2005/0285863 | A1 | 12/2005 | Diamond |
| 2006/0007203 | A1 | 1/2006 | Chen |
| 2006/0012540 | A1 | 1/2006 | Logie |
| 2006/0017847 | A1 | 1/2006 | Tardif |
| 2006/0119603 | A1 | 6/2006 | Chen |
| 2006/0146057 | A1 | 7/2006 | Blythe |
| 2006/0267988 | A1 | 11/2006 | Hussain |
| 2006/0294492 | A1 | 12/2006 | Sakai |
| 2007/0009444 | A1 | 1/2007 | Yamaguchi |
| 2007/0094444 | A1 | 4/2007 | Sutardja |
| 2007/0139422 | A1 | 6/2007 | Kong |
| 2007/0171230 | A1 | 7/2007 | Iwase |
| 2007/0279407 | A1 | 12/2007 | Vasquez |
| 2007/0283175 | A1 | 12/2007 | Marinkovic |
| 2007/0285428 | A1 | 12/2007 | Foster |
| 2008/0030509 | A1 | 2/2008 | Conroy |
| 2008/0030510 | A1 | 2/2008 | Wan |
| 2008/0034238 | A1 | 2/2008 | Hendry |
| 2008/0079736 | A1 | 4/2008 | Maass |
| 2008/0094403 | A1 | 4/2008 | Bakalash |
| 2008/0117217 | A1 | 5/2008 | Bakalash |
| 2008/0117222 | A1 | 5/2008 | Leroy |
| 2008/0129699 | A1 | 6/2008 | Cho |
| 2008/0168285 | A1 | 7/2008 | deCesare |
| 2008/0204460 | A1 | 8/2008 | Marinkovic |
| 2009/0079746 | A1 | 3/2009 | Howard |
| 2009/0085928 | A1 | 4/2009 | Riach |
| 2009/0153528 | A1 | 6/2009 | Orr |
| 2009/0153540 | A1 | 6/2009 | Blinzer |
| 2009/0160865 | A1 | 6/2009 | Grossman |
| 2009/0295810 | A1 | 12/2009 | Endo |
| 2010/0083023 | A1 | 4/2010 | Bjegovic |
| 2010/0083026 | A1 | 4/2010 | Millet |
| 2010/0091025 | A1 | 4/2010 | Nugent |
| 2010/0091039 | A1 | 4/2010 | Marcu |
| 2010/0103147 | A1 | 4/2010 | Sumpter |
| 2010/0164963 | A1 | 7/2010 | Sakariya |
| 2010/0164964 | A1 | 7/2010 | Sakariya |
| 2010/0164966 | A1 | 7/2010 | Sakariya |
| 2011/0032275 | A1 | 2/2011 | Marcu |
| 2011/0164045 | A1 | 7/2011 | Costa |
| 2011/0164046 | A1 | 7/2011 | Niederauer |
| 2011/0164051 | A1 | 7/2011 | Marcu |
| 2011/0216078 | A1 | 9/2011 | Blinzer |
| 2012/0092351 | A1 | 4/2012 | Barnes |

FOREIGN PATENT DOCUMENTS

| | | |
|---|---|---|
| EP | 0272655 A2 | 6/1988 |
| EP | 0497377 A2 | 1/1992 |
| EP | 0482678 A2 | 4/1992 |
| EP | 1061434 A2 | 12/2000 |
| EP | 1158484 A2 | 11/2001 |
| EP | 1962265 A1 | 8/2008 |
| JP | H06006708 A | 1/1994 |
| JP | H06006733 A | 1/1994 |
| JP | H11331638 | 11/1999 |
| JP | 2002055667 | 2/2002 |
| JP | 2007179225 | 7/2007 |
| JP | 2007298932 | 11/2007 |
| JP | 2008040602 A | 2/2008 |
| JP | 2009288430 A1 | 12/2009 |
| TW | 200809692 A | 2/2008 |
| TW | 200821984 A | 5/2008 |
| WO | 02086745 A2 | 10/2002 |
| WO | 2005059880 A1 | 6/2005 |
| WO | 2007140404 A2 | 12/2007 |
| WO | 2008016424 A1 | 2/2008 |
| WO | 2009038902 A1 | 3/2009 |

OTHER PUBLICATIONS

Author Unknown, "Serial-MII Specification," Cisco Systems, Inc., Revision 2.1, pp. 1-7, Sep. 10, 2002.

Gardner, Floyd M., 'Charge Pump Phase-Lock Loops', IEEE Transactions on Communications, vol. Com-28, No. 11, Nov. 1980, pp. 1849-1858.

Kleiman, et al., "Practical Multi-Thread Programming," ASCII Corporation, 1998, first edition, pp. 117-118.

Mann, Justin 'Nvidia prepares hybrid SLI technology to save power,' TechSpot.com, Jun. 25, 2007, downloaded from http://www techspot.com/news/25854-nvid ia-prepares-hybrid-slitechnology-to-save-power.html, Jun. 29, 2009, 3 pages.

Nvidia Hybrid SLI Technology, Technology Overview, Apr. 2008, v01, 2 pages.

Nvidia User Guide, Introducing Hybrid SLI Technology, User Guide, May 2008, DS-03957-001_v01, 21 pages.

FACILITATING EFFICIENT SWITCHING BETWEEN GRAPHICS-PROCESSING UNITS

CROSS REFERENCE AND RELATED APPLICATIONS

This is a continuation of and claims priority to U.S. patent application Ser. No. 12/683,024 filed Jan. 6, 2010 (issued Aug. 5, 2014 as U.S. Pat. No. 8,797,334), which is hereby incorporated by reference.

BACKGROUND

1. Field

The disclosed embodiments relate to techniques for switching between graphics-processing units (GPUs) in a computer system. More specifically, the disclosed embodiments relate to techniques that "preheat" a GPU to facilitate a rapid switchover to the GPU.

2. Related Art

Advances in computational performance have enabled computer systems to effectively manipulate large amounts of graphical data at high transfer rates. For example, computer systems are commonly used to render complex scenes for video games, and to manipulate video streams and digital photographs. To facilitate rapid processing of such graphical data, computer systems typically include specialized graphics processors (referred to as "graphics-processing units" (GPUs)) to drive graphical display devices, such as computer system monitors. Unfortunately, powerful GPUs consume large amounts of power and can cause heat dissipation problems.

One solution to this problem is to save power during low-activity periods by switching from a high-power GPU that provides higher performance to a low-power GPU with lower performance. However, the process of initializing a GPU in preparation for a switching operation involves a significant number of configuration operations, which can consume a considerable amount of time. For example, during the process of initializing a GPU, the GPU's mode settings need to be initialized, color lookup tables need to be populated, and associated drivers need to be reconfigured. These configuration operations can cause significant delays in computer system responsiveness, which can be annoying to the user.

Hence, what is needed is a technique that facilitates efficiently switching between GPUs without the above-described problems.

SUMMARY

The disclosed embodiments provide a system that facilitates seamlessly switching between graphics-processing units (GPUs) to drive a display. During operation, the system receives a request to switch from using a first GPU to using a second GPU to drive the display. In response to this request, the system uses a kernel thread which operates in the background to configure the second GPU in preparation for driving the display. While the kernel thread is configuring the second GPU, a user thread continues to execute a window manager which performs operations associated with servicing user requests. When configuration of the second GPU is complete, the system switches the signal source for the display from the first GPU to the second GPU.

In some embodiments, configuring the second GPU involves first powering up the second GPU, and then performing hardware-configuration operations for the second GPU.

In some embodiments, performing the hardware-configuration operations involves: reinitializing drivers for the second GPU; performing a display probing operation to determine characteristics of the display; copying mode settings from the first GPU to the second GPU; and copying at least one color lookup table (CLUT) from the first GPU to the second GPU.

In some embodiments, prior to switching the signal source from the first GPU to the second GPU, the user thread executes a streamlined code path which performs software-configuration operations to initialize application-visible data structures associated with the window manager and the second GPU, and also renders a first image for the second GPU.

In some embodiments, executing the streamlined code path involves repeating some operations which were previously performed by the kernel thread to configure the second GPU, wherein the repeated operations will have already been completed by the kernel thread or will access cached values, and will consequently execute more quickly.

In some embodiments, after the signal source is switched, the system uses the kernel thread to tear down the configuration for the first GPU. This tear-down process can involve: removing application-visible data structures associated with the window manager and the first GPU; removing driver state information associated with the first GPU; and removing power from the first GPU.

In one embodiment, the first GPU is a low-power GPU which is integrated into a processor chipset, and the second GPU is a high-power GPU which resides on a discrete GPU chip, or vice versa. In another embodiment, the first GPU and the second GPU have substantially identical circuitry and substantially similar capabilities. In yet another embodiment, the first GPU is a general-purpose processor which runs graphics code, and the second GPU is a special-purpose graphics processor, or vice versa.

Another embodiment also provides a system that switches from using a first GPU to using a second GPU to drive a display. During operation, the system drives the display from the first GPU while a thread configures the second GPU to drive the display. Next, after configuration of the second GPU is complete, the system switches the signal source which drives the display from the first GPU to the second GPU.

DETAILED DESCRIPTION

Overview

In existing computer systems that support multiple GPUs, when there is a decision to switch GPUs, the systems typically uses a generic reconfiguration mechanism to initialize the new GPU. This generic reconfiguration mechanism executes the same code path that is executed when a new external monitor is plugged in. However, unlike the case of a new external monitor, a GPU switch does not involve changing displays.

In the described embodiments, this fact enables the system to "preheat" the new GPU, which involves making a number of configuration assumptions, and copying some configuration information (e.g., color profile/information) between the GPUs before the window manager is notified of the switch. To hide the effects of these configuration operations from the user, the configuration operations can be performed by a kernel thread which operates in the background. While the kernel thread is performing configuration operations in the background, the window manager can continue executing normally in the foreground. This allows the system to continue interacting with the user during the "preheat" process.

Because the kernel thread pre-configures the GPUs to be very close to each other, performing the actual GPU switch involves executing a simpler "streamlined code path" that is tuned for performing the switch. For example, during the preheat process, the kernel thread can cache data about the currently running GPU (e.g., type of video card, modes supported). This allows the streamlined code path to subsequently access the cached data rather than querying it from the currently running GPU. Note that caching information indicating which modes are supported by the GPU is advantageous because the system needs to know how to set the modes in the new GPU to match the modes in the currently running GPU. This prevents stalls because the system does not try to access the new GPU while it is powering-on. The graphics drivers have also been changed to take advantage of the fact that the operation is a GPU switch, thereby eliminating certain initialization operations that may be required when a new external monitor is plugged in but are not required during a GPU switch.

By using the "preheat" process and a streamlined code path to perform a GPU switch, there is no longer any need to put the two GPUs in a mirrored state for a length of time (e.g., 2-4 seconds) during which client applications can actually discern the mirrored state and users can perceive disturbances on the driven display and in interactions with the window manager. Note that some of the disclosed embodiments actually do place the GPUs in a mirrored state, but only for the time required to paint a first image and switch (e.g., about 16 milliseconds). Moreover, the system locks out clients during this time, so the clients never see the mirrored state. Because clients are only locked out for about 16 milliseconds in some embodiments, the user perceives little to no disturbance on the display or in the user's interactions with the window manager. In contrast, in existing systems, the window manager may be blocked for 2-4 seconds during a GPU switch.

This new, more-efficient GPU-switching process is described in more detail below, but first we describe some of the associated computer system hardware.

Computer System

Figure 1:
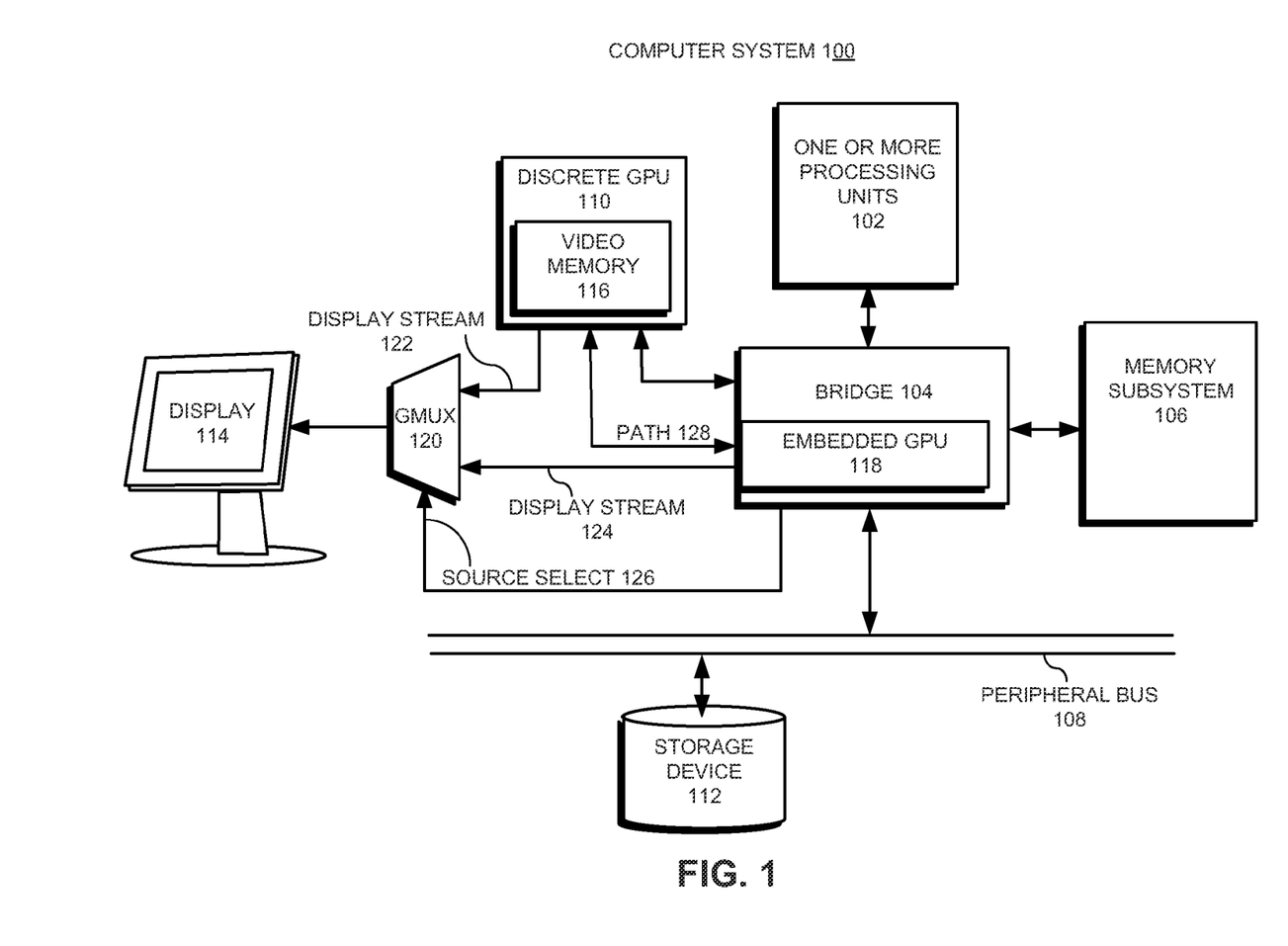
FIG. 1 illustrates a computer system which can switch between different graphics sources to drive the same display in accordance with one embodiment.

FIG. 1 illustrates a computer system 100 which can switch between two graphics sources to drive a display in accordance with one embodiment. Referring to FIG. 1, the two graphics sources include (1) a discrete GPU 110 and (2) an embedded GPU 118, which can each independently drive display 114. The graphics source which drives display 114 is determined by GPU multiplexer (GMUX) 120, which selects between the two graphics sources. Hence, computer system 100 can use GMUX 120 to select a graphics source based on current operation conditions.

During operation, display stream 122 from discrete GPU 110, and display stream 124 from embedded GPU 118 both feed into data inputs of GMUX 120. Source select signal 126 feeds into a select input of GMUX 120 and determines which one of the two graphics sources will drive display 114. In the illustrated embodiment, source select signal 126 is produced by bridge chip 104, which includes specific logic for generating source select signal 126. (Note that source select signal 126 can also be produced by a logic block other than bridge chip 104. For example, source select signal 126 can be produced by one or more processing units 102.) The display stream from the selected graphics source then feeds into display 114.

In one embodiment, discrete GPU 110 and embedded GPU 118 communicate through data path 128 to synchronize their display streams. Note that synchronizing the display streams can involve synchronizing both the respective timing signals and the respective data signals.

In one embodiment, discrete GPU 110 is a high-performance GPU which consumes a significant amount of power relative to embedded GPU 118, a lower-performance GPU which consumes a smaller amount of power. In this embodiment, when the graphics-processing load is light, the system switches from using discrete GPU 110 to using embedded GPU 118 to drive display 114, and subsequently powers down discrete GPU 110, thereby saving power. On the other hand, when the graphics-processing load becomes heavy again, the system switches graphics sources from embedded GPU 118 back to discrete GPU 110.

Although we have described a system that includes a discrete GPU and an integrated GPU, the disclosed technique can generally work in any computer system comprising two or more GPUs, wherein each of the GPUs can independently drive the display. Moreover, these multiple GPUs can have different operating characteristics and power-consumption levels. Hence, the disclosed technique is not limited to the specific embodiment illustrated in FIG. 1.

Also note that the above-described process for switching between graphics sources does not involve shutting down or reinitializing the computer system. As a result, the switching process can take substantially less time than it would have if a re-initialization had been required. Consequently, the disclosed technique facilitates rapid and frequent switching between the graphics sources.

Graphics Multiplexer

Figure 2:
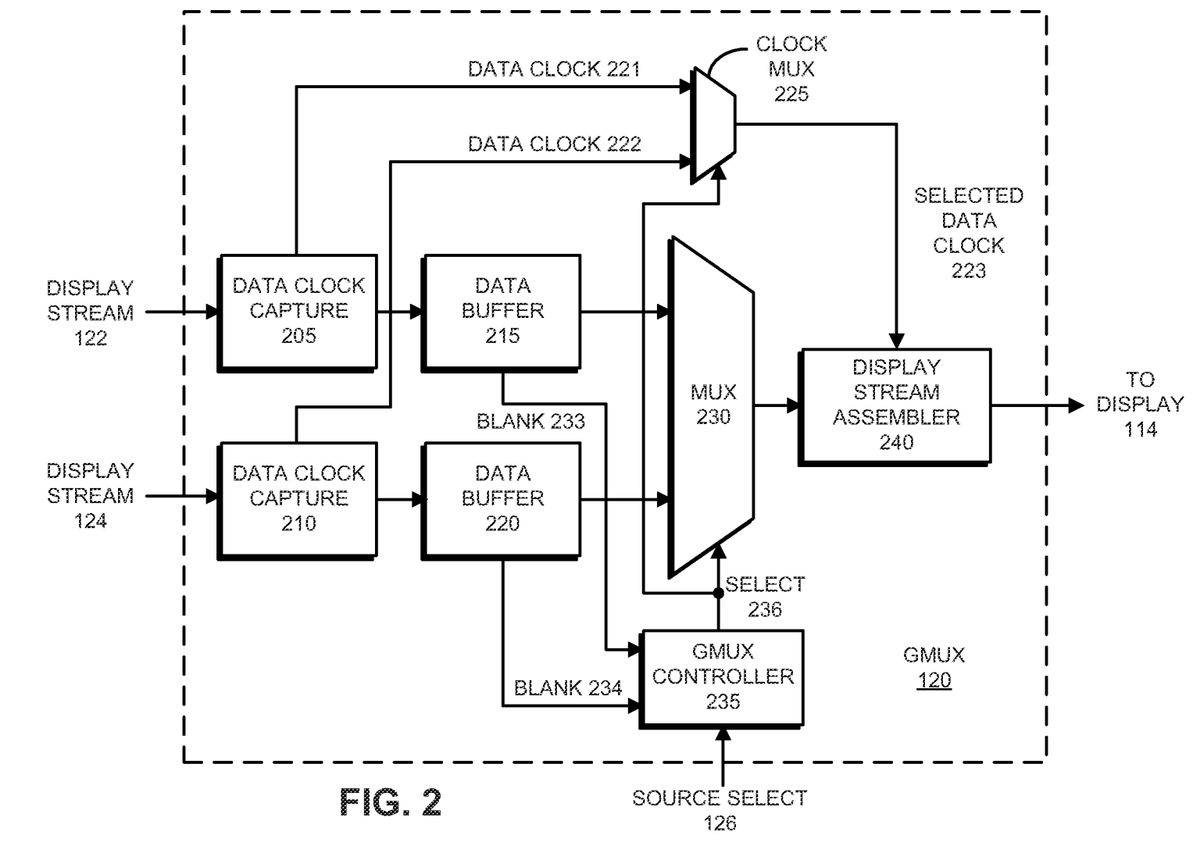
FIG. 2 illustrates the structure of a graphics multiplexer in accordance with one embodiment.

FIG. 2 illustrates the internal structure of the graphics multiplexer 120 (described above with reference to FIG. 1) in accordance with one embodiment. Referring to FIG. 2, display stream 122 from discrete GPU 110 and display stream 124 from embedded GPU 118 feed into data clock capture blocks 205 and 210, respectively. Data clock capture blocks 205 and 210 de-serialize display streams 122 and 124 and also extract respective data clock signals 221 and 222.

These data clock signals 221 and 222 feed into clock MUX 225, which selects one of data clocks 221 and 222 to be forwarded to display stream assembler 240. In one embodiment, the GMUX controller 235 provides select signal 236 to clock MUX 225. Alternatively, select signal 236 can be provided by other sources, such as a processor in one or more processor units 102 or another controller.

Next, display streams 122 and 124, with data clocks separated, feed into data buffers 215 and 220, respectively. Data buffers 215 and 220 examine display streams 122 and 124 to determine when blanking intervals occur, and produce respective blanking interval signals 233 and 234. Data buffers 215 and 220 also produce output data streams that feed into data MUX 230.

Blanking interval signals 233 and 234 feed into GMUX controller 235, which compares blanking intervals 233 and 234 to determine how much overlap, if any, exists between the blanking intervals of display streams 122 and 124. (Note that blanking interval signals 233 and 234 can indicate vertical or horizontal blanking intervals.) If GMUX controller 235 determines that blanking intervals 233 and 234 have a sufficient amount of overlap, GMUX controller 235 asserts select signal 236 as the blanking intervals begin to overlap. This causes clock MUX 225 and data MUX 230 to switch between display streams 122 and 124 during the period when their blanking intervals overlap. Because the switching occurs during the blanking intervals, the switching process will not be visible on display 114.

Finally, the output of data MUX 230 and the selected data clock 223 feed into display stream assembler 240, which re-serializes the data stream before sending the data stream to display 114.

Switching Process

Figure 3:
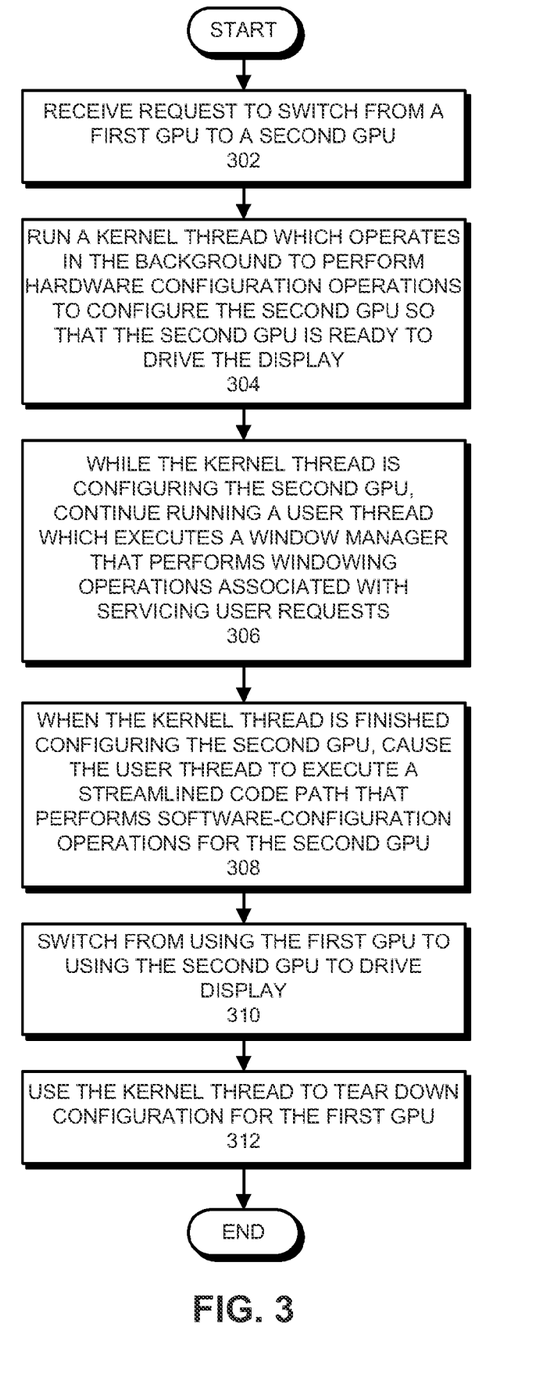
FIG. 3 presents a flow chart illustrating the operations involved in switching between GPUs in accordance with one embodiment.

FIG. 3 provides an overview of the operations involved in switching between GPUs in accordance with one embodiment. First, the operating system receives a request to switch from using the first GPU to using a second GPU as a signal source for driving the display (step 302). This request can be initiated based on an increase (or a decrease) in graphics workload. This request can be generated by the operating system or by background process which monitors the graphics workload. In response to this request, the operating system spawns (or activates) a kernel thread which operates in the background to perform hardware-configuration operations for the second GPU to prepare the second GPU to drive the display (step 304). The system also continues to drive the display with the first GPU. Note that, while the kernel thread is configuring the second GPU, the operating system continues to run a user thread to execute a window manager which performs operations associated with servicing user requests (step 306). Next, after the kernel thread has performed the hardware-configuration operations for the second GPU, the user thread executes a streamlined code path that performs software-configuration operations for the second GPU (step 308). Then, the operating system switches the signal source which drives the display from the first GPU to the second GPU (step 310). Finally, after the signal source is switched, the operating system uses the kernel thread to tear down the configuration for the first GPU (step 312).

Figure 4:
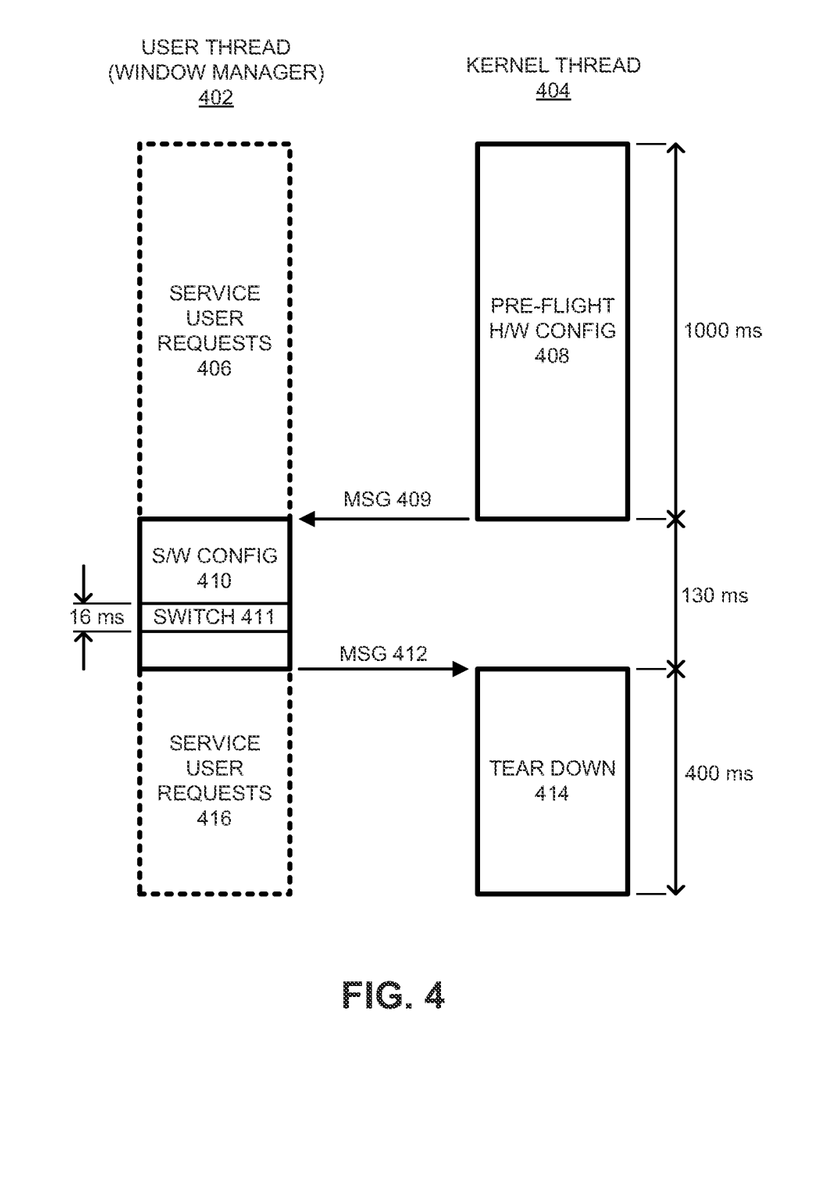
FIG. 4 presents a timeline of the operations involved in switching between GPUs in accordance with one embodiment.

These above-described configuration operations are illustrated in more detail in the timeline which appears in FIG. 4. The left-hand column in FIG. 4 illustrates the actions of a user thread 402, which executes a window manager for the computer system in the foreground. In contrast, the right-hand column in FIG. 4 illustrates the actions of kernel thread 404 which performs configuration and teardown operations in the background.

Figure 5:
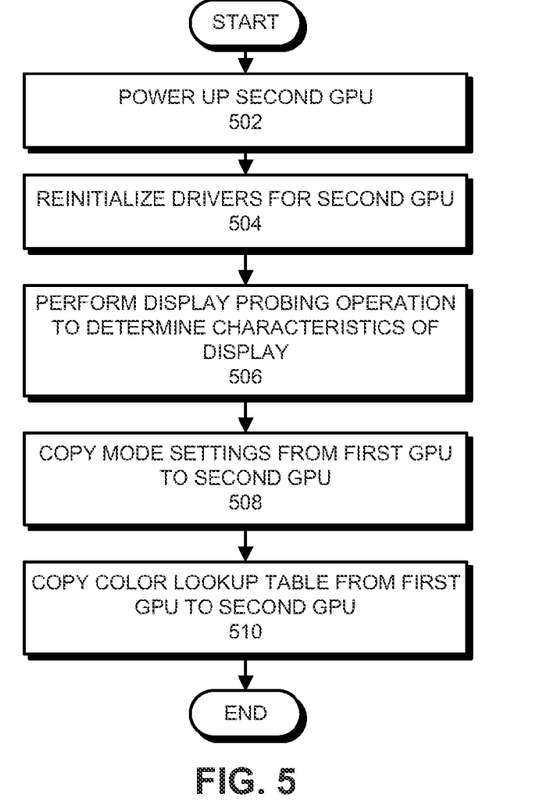
FIG. 5 presents a flow chart illustrating hardware-configuration operations performed by a kernel thread in accordance with one embodiment.

As mentioned above, when the request to switch is received, the operating system uses kernel thread 404 to preflight various hardware-configuration operations 408. Referring to the flow chart illustrated in FIG. 5, these hardware-configuration operations can involve powering up the second GPU (step 502) and also reinitializing drivers for the second GPU (step 504). Kernel thread 404 also performs a "display probing" operation to determine characteristics of the monitor which is being driven (step 506). Next, kernel thread 404 copies various types of configuration information from the first GPU to the second GPU. For example, kernel thread 404 can copy mode settings from the first GPU to the second GPU (step 508), where these mode settings can specify the resolution and depth of the display. Kernel thread 504 can also copy the contents of a color lookup table (CLUT) from the first GPU to the second GPU (step 510).

While the kernel thread 404 is configuring the second GPU, user thread 402 continues to execute a window manager (for a windowing system) which performs operations associated with servicing user requests 406. This allows the user to interact with the windowing system without interruption while the hardware-configuration operations are taking place.

Figure 6:
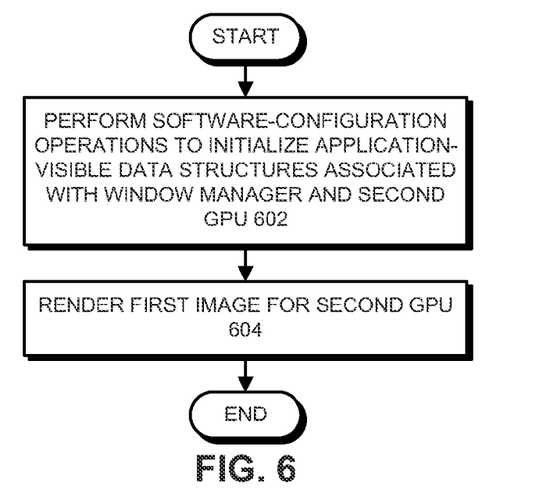
FIG. 6 presents a flow chart illustrating software-configuration operations performed by a user thread in accordance with one embodiment.

When kernel thread 404 completes the hardware-configuration operations, it sends an interrupt 409 to the window manager. This interrupt 409 causes the window manager to execute a streamlined code path that performs various software-configuration operations 410. Referring to the flow chart illustrated in FIG. 6, these software-configuration operations can involve initializing application-visible data structures containing state information for the second GPU (step 602). The system also renders a first image for the second GPU (step 604). Note that some of these software configuration operations (which do not involve accessing data structures in user space) can possibly be performed by the kernel thread 404.

Note that the configuration operations performed while switching between GPUs differ from the generic configuration operations performed after a new monitor is plugged in because during a switching operation the new frame buffer is not visible until after the switch occurs. This enables some time-consuming generic configuration operations to be elided. For example, because the new frame buffer is not initially visible, it is unnecessary to wipe the contents of the frame buffer. It is also unnecessary to perform color lookup table (CLUT) fading operations to gradually fade down and fade up the display. The system can also elide the rendering of the last frame to the first GPU because the output of the first GPU will be frozen on a penultimate frame during the switchover process.

Next, the system switches from using the first GPU to using a second GPU as a signal source for driving the display. In one embodiment, the output of the first GPU is held fixed during a selected blanking interval, and the selected blanking interval is "stretched" until the second GPU enters a blanking interval, at which time the switching operation takes place. This ensures that the switching operation only freezes the display for a single frame (about 16 milliseconds), which is almost imperceptible to the user.

Next, after the switchover is complete, the window manager sends an interrupt 412 back to the kernel thread 404. In response to interrupt 412, kernel thread 404 performs a number of operations to "tear down" the configuration of the first GPU 414. Note that, while these tear-down operations are being performed, the window manager continues to perform operations associated with servicing user requests 416.

Figure 7:
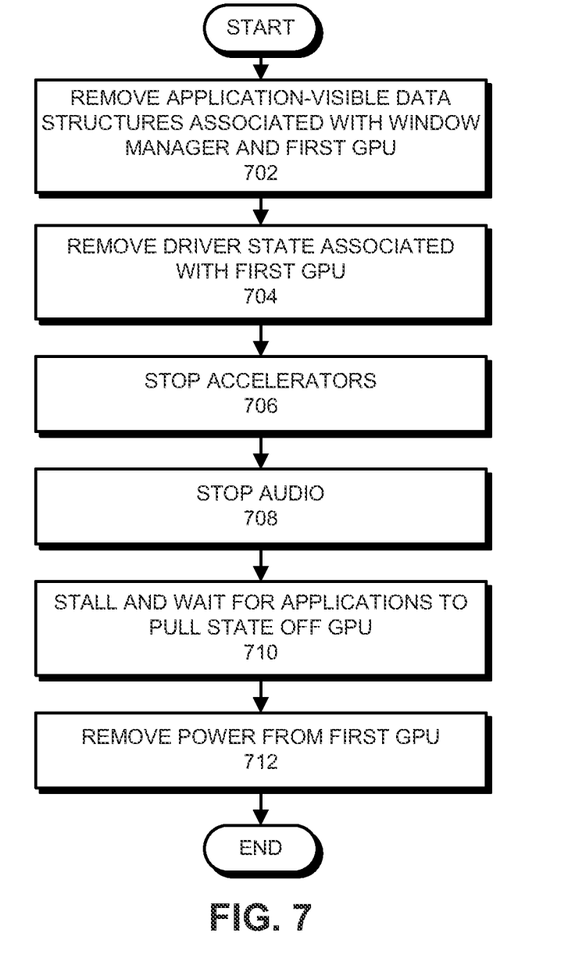
FIG. 7 presents a flow chart illustrating operations involved in tearing down the configuration of a GPU in accordance with one embodiment.

Referring to the flow chart illustrated in FIG. 7, during a tear-down operation kernel thread 404 removes application-visible data structures containing state information associated with the first GPU (step 702), and removes driver state associated with the first GPU (step 704). Kernel thread 404 also halts accelerators (step 706) and audio processing (step 708) associated with the first GPU. Then, kernel thread 404 stalls and waits for applications to pull state information off of the first GPU (step 710). Finally, kernel thread 404 removes power from the first GPU (step 712).

The vertical timeline which appears on the right-hand side of FIG. 4 illustrates, in one embodiment, how using the kernel thread 404 can effectively hide the configuration operations involved in switching GPUs from the user. First, the kernel thread 404 performs the preflight (also referred to as "preheat") hardware-configuration operations 408 for about 1000 milliseconds while the window manager continues to service user requests 406. Next, the window manager executes a streamlined code path which performs software-configuration operations 410 for about 130 milliseconds. During this small amount of time (about ⅛ of a second), the interactions with the user may be affected, but this is barely perceptible. Also, as mentioned above, the switchover operations require only about 16 milliseconds, which is not likely to be perceptible to the user. Finally, the tear-down process 414 requires about 400 milliseconds for the kernel thread to complete. However, during this time the window manager is able to service user requests.

High-Level Description

Figure 8:
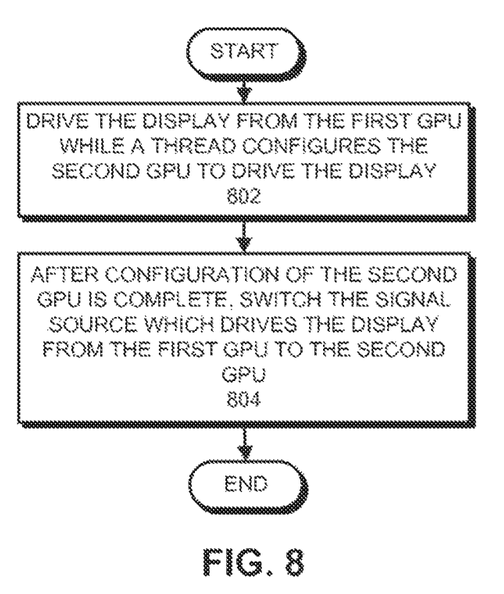
FIG. 8 presents a high-level flow chart of the process of switching between GPUs in accordance with one embodiment.

FIG. 8 presents a high-level flow chart illustrating the process of switching between GPUs in accordance with one embodiment. During operation, the system drives the display from a first GPU while a thread configures a second GPU to drive the display (step 802). Next, after configuration of the second GPU is complete, the system switches the signal source which drives the display from the first GPU to the second GPU (step 804).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

Moreover, the preceding description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

What is claimed is:

1. A method for switching from using a first graphics-processing unit (GPU) to using a second GPU to drive a display, comprising:
   using software executing in a foreground on a central processing unit (CPU) to perform operations associated with servicing user activity;
   receiving a request to switch from using the first GPU to using the second GPU as a signal source for driving the display;
   while continuing use of the foreground executing software to continue performing operations associated with servicing the user activity, using software executing in a background on the CPU to configure hardware of the second GPU in preparation for driving the display in response to the request;
   receiving a notification related to a status of the hardware configuration of the second GPU;
   in response to the notification, configuring software of the second GPU while continuing use of the foreground executing software to continue performing operations associated with servicing the user activity; and
   switching the signal source driving the display from the first GPU to the second GPU.

2. The method of claim 1, wherein configuring the hardware of the second GPU includes copying mode setting information from the first GPU to the second GPU.

3. The method of claim 2, wherein the mode setting information comprises one or more of the following:
   a resolution of the display;
   a depth of the display; and
   a color lookup table depth of the display.

4. The method of claim 1, wherein the foreground executing software is part of the operating system and comprises window manager software.

5. The method of claim 1, wherein configuring the software of the second GPU includes at least one of: initializing application-visible data structures containing state information for the second GPU and rendering a first image for the second GPU.

6. The method of claim 1, wherein the notification is an interrupt.

7. The method of claim 6, wherein the interrupt indicates the hardware configuration of the second GPU is complete.

8. A non-transitory computer readable medium comprising one or more instructions that when executed on a central processing unit (CPU) configure the CPU to:
   use software executing in a foreground on the CPU to perform operations associated with servicing user activity;
   determine a request has been made to switch from using a first graphics-processing unit (GPU) to using a second GPU as a signal source for driving a display;
   while continuing use of the foreground executing software to continue performing operations associated with servicing the user activity, use software executing in a background to configure hardware of the second GPU in preparation for driving the display in response to the request;

determine a notification has been made related to a status of the hardware configuration of the second GPU;

in response to the notification, configure software of the second GPU while continuing use of the foreground executing software to continue performing operations associated with servicing the user activity; and switch the signal source driving the display from the first GPU to the second GPU.

9. The non-transitory computer readable medium of claim 8, wherein configuring the hardware of the second GPU includes copying mode setting information from the first GPU to the second GPU.

10. The non-transitory computer readable medium of claim 9, wherein the mode setting information comprises at least one of:
   a resolution of the display;
   a depth of the display; and
   a color lookup table depth of the display.

11. The non-transitory computer readable medium of claim 8, wherein the foreground executing software comprises window manager software.

12. The non-transitory computer readable medium of claim 8, wherein configuring the software of the second GPU includes at least one of: initializing application-visible data structures containing state information for the second GPU and rendering a first image for the second GPU.

13. The non-transitory computer readable medium of claim 8, wherein the notification is an interrupt.

14. The non-transitory computer readable medium of claim 13, wherein the interrupt indicates the hardware configuration of the second GPU is complete.

15. A computer system that switches from a first graphics-processing unit (GPU) to a second GPU to drive a display, comprising:
   a first GPU;
   a second GPU;
   a memory for storing instructions for a central processing unit (CPU);
   a switch comprising a first input to receive an output of the first GPU, a second input to receive an output of the second GPU, and a switch output coupled to a signal source driving the display;
   the CPU for executing the instructions stored in the memory, certain instructions when executed cause the computer system to:
      use a first foreground software to perform operations associated with servicing user activity;
      determine a request has been made to switch from using the first GPU to using the second GPU as a signal source for driving the display;
      while continuing use of the foreground executing software to continue performing operations associated with servicing the user activity, use software executing in a background to configure hardware of the second GPU in preparation for driving the display in response to the request;
      receive a notification related to a status of the hardware configuration of the second GPU;
      in response to the notification, configure software of the second GPU while continuing use of the foreground executing software to continue performing operations associated with servicing the user activity; and
      activate the switch so that the signal source driving the display switches from the first GPU to the second GPU.

16. The computer system of claim 15, wherein the switch is a GPU multiplexor.

17. The computer system of claim 15, wherein the memory for storing instructions includes volatile memory and non-volatile memory.

18. The computer system of claim 15, wherein configuring the hardware of the second GPU includes copying mode setting information from the first GPU to the second GPU, such mode setting information comprising one or more of:
   a resolution of the display;
   a depth of the display; and
   a color lookup table depth of the display.

19. The computer system of claim 15, wherein configuring the software of the second GPU includes initializing application-visible data structures containing state information for the second GPU.

20. The computer system of claim 15, wherein the notification is an interrupt that indicates the hardware configuration of the second GPU is complete.

* * * * *